United States Patent Office 2,893,459
Patented July 7, 1959

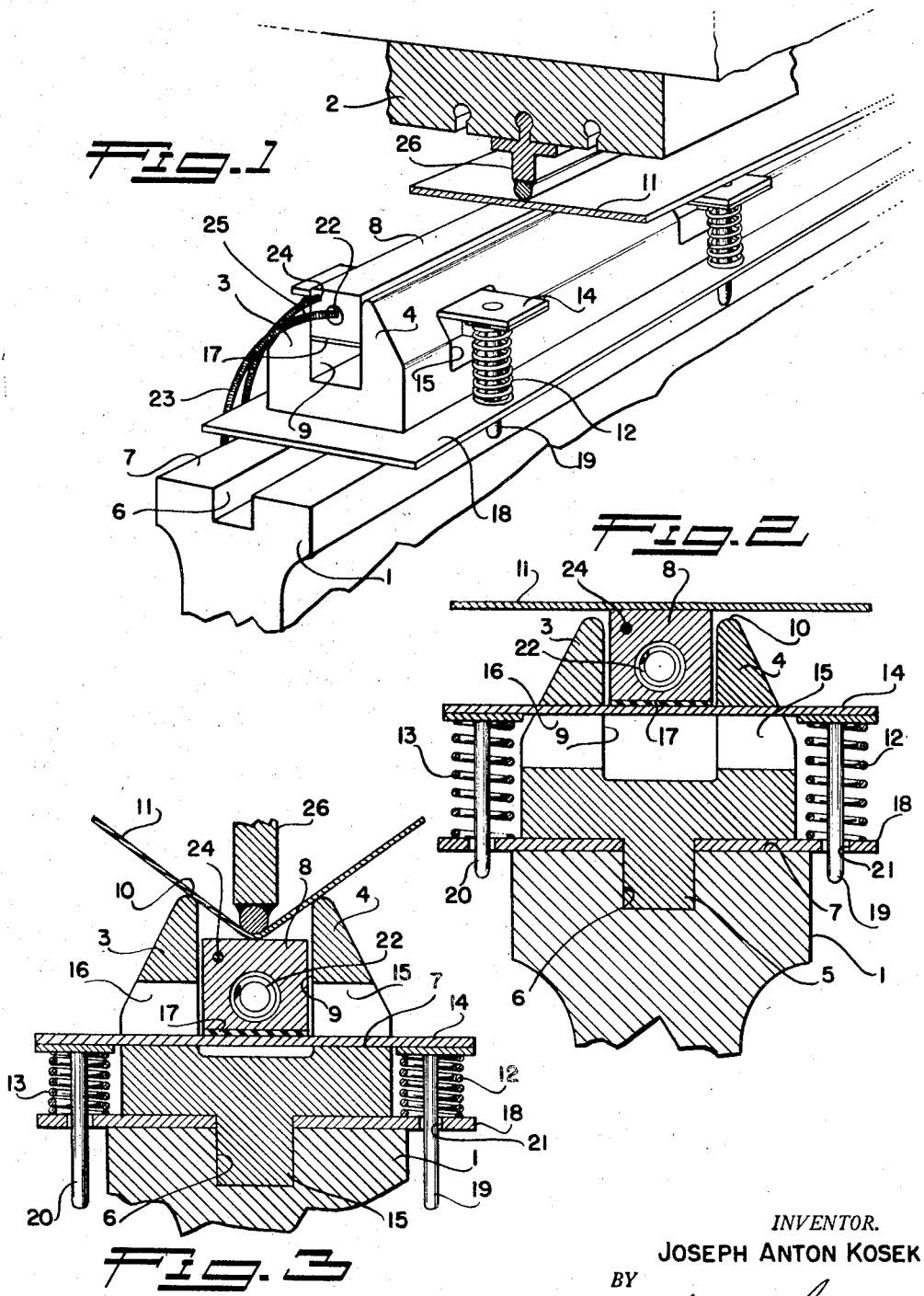

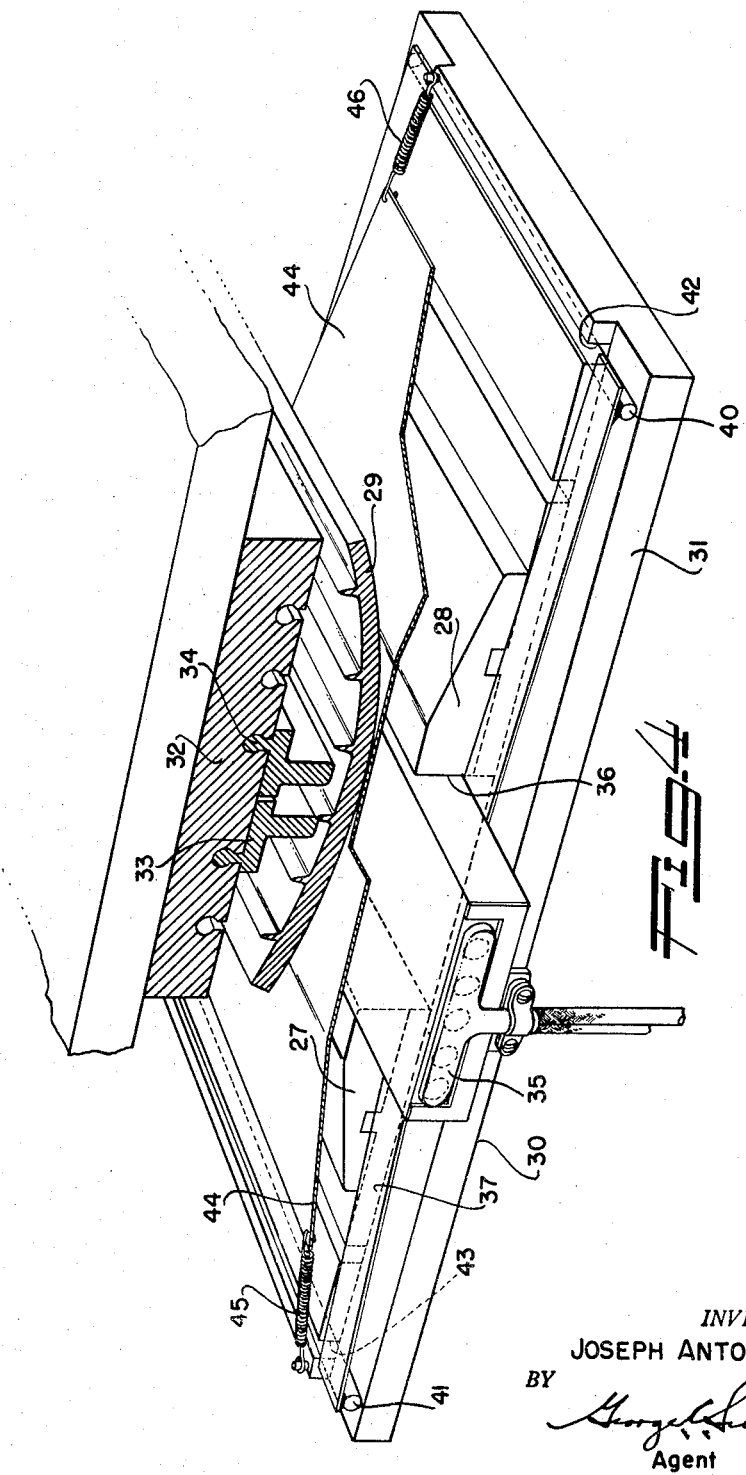

2,893,459

POWER BRAKE HAVING WORK SUPPORTING PLATEN WITH HEATING MEANS FOR WORK

Joseph A. Kosek, Atlanta, Ga., assignor to Lockheed Aircraft Corporation, Burbank, Calif.

Application October 21, 1954, Serial No. 463,637

2 Claims. (Cl. 153—21)

This invention relates to metal forming machines and more particularly to a heating device for use in conjunction with power brake dies, or the like.

A power brake type of metal forming machine conventionally consists of a pair of spaced die blocks secured to the base of the machine and an upper die or punch secured to a movable head which is adapted to engage a sheet of metal resting on the spaced die blocks and apply a bending force thereto for shaping the metal sheet between the two spaced die blocks. This type of machine is used extensively in the fabrication of aircraft fuselage and wing panels. Such a press will readily accommodate integrally stiffened or webbed sheet metal as well as ordinary flat sheet metal and form the same to any desired curvature more easily and more quickly than other known forming methods.

The high strength, high temperature structural requirements in the design of high speed aircraft has necessitated the extensive use of materials such as titanium and magnesium, or alloys thereof, which are difficult, if not impossible, to form by conventional cold work metal forming machines and methods. Such metals can only be formed, successfully at least, at elevated temperatures whereas metals such as aluminum and many of the aluminum alloys, which were used extensively for the manufacture of air frames in the past, can be readily coldworked. Because of this rather rapid change in the requirements for forming methods used by the aircraft industry, metal forming machines such as the power brake has become less useful while draw presses, and the like, capable of utilizing heated dies have increased in popularity, even though they are less efficient for a great many forming operations.

Hot forming methods, other than those utilizing heated dies, have been used in the past wherein the material is heated prior to being formed. In this method, while the workpiece is being formed it, of course, cools off and in many cases before the forming operation is completed it cools to a point where satisfactory forming is no longer possible, consequently the part ruptures or otherwise becomes defective. Titanium and magnesium, as well as aluminum, are excellent conductors of heat and while they will readily absorb heat they are incapable of retaining heat once the heat source is removed. Therefore, pre-heating methods, while satisfactory in some applications, are obviously defective for forming materials such as Titanium and magnesium or where the forming operation cannot be performed in a very short time. Moreover, pre-heating methods complicate the handling problems associated with such operations since they heat the entire workpiece.

An object of this invention is to provide a heating device for power brake presses, and the like, which is capable of applying heat to the part to be formed substantially throughout the forming operation whereby the desired forming temperature may be maintained. This avoids the undesirable requirement when pre-heating parts to be formed in accordance with conventional methods, of raising the temperature of the part to a higher value than is required for forming so that when the forming operation is executed the previously heated part will be at the approximate forming temperature required for the operation. Since raising the temperature of a metal part above a certain critical value will change its internal structural characteristics, there is a practical limitation on the use of the forming methods employing the pre-heating idea, making it mandatory that the forming operation be completed in a very short time following the heating step in order to avoid overheating the metal and still maintain the temperature of the part sufficiently high at the time the forming operation is accomplished.

Another object of this invention is to provide a heating device for power brake presses, and the like, which will require no additional steps over those normally required when using the conventional power brake presses for cold-work operations whereby metal such as titanium and magnesium may be successfully and efficiently formed using such equipment.

Still another object of this invention is to provide a heating device which may be incorporated into conventional power brake presses with only slight modifications to the brake press base member and lower die blocks.

Still another object of this invention is to provide a heating device for power brake presses, and the like, which will apply heat to the part to be formed only in the area being stressed whereby the part may be handled substantially in accordance with conventional techniques.

Further and other objects will become apparent from a reading of the following description, especially when considered in combination with the accompanying drawing wherein like numbers refer to like parts.

In the drawing:

Figure 1 is a fragmentary perspective view of a typical power brake press incorporating the heating device of this invention;

Figure 2 is a sectional view of the lower die portion of the power brake press showing the heating device in the fully extended position;

Figure 3 is a sectional view of the lower die portion of the power brake press showing the heating device in the fully retracted position; and Figure 4 is a fragmentary perspective view showing a modified form of the power brake press shown in Figure 1.

The power brake press as shown in Figure 1 includes a base member 1 and a head member 2 movable relative to the base member for effecting the forming operation. A pair of spaced lower die blocks, 3 and 4, are suitably secured to base member 1 such as by a tongue 5 which is adapted to engage a groove 6 formed in the flat die supporting surface 7 of the base member. A platen 8, which may be made in sections, is inserted within the cavity 9 formed by the spaced die blocks 3 and 4. Cavity 9, which is generally rectangular in cross section has a depth sufficient to allow platen 8 to retract from the extended position shown in Figures 1 and 2 projecting slightly beyond the tip end 10 of die blocks 3 and 4 to a position which will allow the required movement of the brake press dies for forming a part or workpiece 11, such as sheet metal, to the desired curvature. Platen 8 is always urged upwardly relative to base member 1 toward the extended platen position by means of a plurality of pairs of helical springs, such as 12 and 13. Springs 12 and 13 apply a force on platen 8 urging the same to the extended position through a strap 14, extending transversely of the platen and through openings 15 and 16 in die blocks 3 and 4. A suitable thermal insulating material 17, such as fibre glass or asbestos, is inserted between strap 14 and platen 8 to minimize the transfer of heat from platen 8 to the other parts of the press. Spacing the platen from the die blocks, as shown in Fig. 2 and Fig. 3, further isolates the heated platen thus additionally minimizing heat loss to the surrounding press parts and thus, in combination with the aforementioned insulation strip, prevents undesirable heating of these surrounding parts. Springs, such as 12 and 13, are supported by base member 1 through a base plate 18 which is interposed between base member 1 and die blocks 3 and 4 and held in position by suitable means such as by the weight of the dies. Guide pins 19 and 20 are carried by strap 14 and extend concentrically through springs 12 and 13 as well as through openings 21 in base plate 18 for guiding the movement of platen 8.

Platen 8 is maintained at a temperature equal to or slightly above the required forming temperature for the metal workpiece 11, by suitable means such as electrical resistance heating coils 22, as best shown in Figure 2. Electrical energy is applied to heating coils 22 through a flexible lead 23 from a power source (not shown) which may be remote from the power brake press. While the temperature of platen 8 may be maintained manually, it is preferred that temperature regulation be made automatic by means of a thermocouple 24 carried by the platen as also shown in Figure 2. A lead 25 from thermocouple 24 extends from platen 8 to a conventional thermostatic control box (not shown).

An upper die or punch 26 is suitably secured to movable head member 2 of the power brake press at a location longitudinally bisecting the two spaced die blocks 3 and 4 whereby workpiece 11, inserted between punch 26 and lower die blocks 3 and 4, may be symmetrically loaded and formed to the desired curvature by lowering head member 2, as indicated in Figure 3.

As best shown in Figure 2, when workpiece 11 is inserted between punch 26 and lower die blocks 3 and 4, it rests upon hot platen 8. With materials such as titanium and magnesium, which are excellent heat conductors, the part to be formed is almost immediately brought to the temperature of the platen in the area where metal-to-metal contact is made. This metal-to-metal contact is vitally important to the successful operation of the heating device when forming magnesium or titanium or aluminum sheet material since such materials have a high heat reflectivity and will reflect heat rather than absorb it unless actual contact is made with the platen. After the metal sheet or workpiece 11 is properly positioned in the press, head 2 is lowered, causing punch 26 to engage the sheet from which the part is to be made and bend the same between the spaced lower die blocks 3 and 4. Continued movement of head 2, toward base member 1, increases the amount of curvature in workpiece 11 until the desired shape is obtained. As workpiece 11 is being formed, platen 8 retracts within cavity 9 against the action of springs 12 and 13, allowing the lowering of head 2 until a bottoming position is reached, as indicated in Figure 3. All during the forming operation platen 8 is in contact with the workpiece, maintaining the same at the desired elevated temperature for satisfactorily accomplishing the forming operation. When the part is formed to the desired shape, head 2 and punch 26 is retracted upwardly and the part is removed, allowing platen 8 to automatically raise to the extended position for engaging a new workpiece or a new portion of the same workpiece in preparation for repeating the forming cycle of the press.

A modified form of the invention is shown in Figure 4 wherein a brake press 30 of the type used for constant moment bending operations is employed. In the configuration of Figure 4, the spacing between lower die blocks 27 and 28 is larger than the spacing between the die blocks in the configuration of Figure 1 whereby parts requiring a milder curvature may be more efficiently formed. Fuselage and wing panels normally come within this classification. A sheet of metal 29, having inwardly formed ridges thereon for stiffening purposes is shown being formed in the press of Figure 4 since this is a typical application of the power brake press. Press 30 of Figure 4 includes a base member 31 and a movable head member 32 which function in the same manner as do the corresponding components of the power brake press of Figure 1. The upper die or punch in Figure 4 consists of two die parts 33 and 34 which are spaced apart a distance less than the spacing of lower die blocks 27 and 28 to maintain a nearly constant bending moment on sheet metal 29 whereby a smooth, continuous curvature is obtained.

Heated platen 35, located between the spaced die blocks 27 and 28, is supported within channel 36 by leaf springs 37 which extend laterally outwardly to fixedly connect with support rods 40 and 41. Rods 40 and 41 ride in grooves 42 and 43 formed in base member 31 which provides only limited clearance whereby the movement of platen 35 within channel 36 from an extended position shown in Figure 4 to a retracted position, is closely controlled. As platen 35 is forced to move from the extended position, projecting slightly beyond lower dies 27 and 28 toward the retracted position due to the movement of head member 32 in executing the forming operation, a compression load is applied to leaf springs 37 causing the same to act as column in bending whereby the support rods rotate within key slots 42 and 43 to allow the necessary platen movement.

When forming sheet metal at elevated temperatures, the sheet has a tendency to weld itself to the dies under the concentrated loads. This destroys the surface finish of the metal and is highly undesirable when forming fuselage and wing panels. This action, normally referred to as "galling," may be eliminated when necessary by the use of a bearing plate 44, as shown in Figure 4. Bearing plate 44 rests directly on die blocks 27 and 28 as well as on platen 35 and is held in position under tension by means of a plurality of springs such as springs 45 and 46. The sheet material 29 rests upon bearing plate 44 and is heated by platen 35 by conduction through plate 44. Since there is actual metal-to-metal contact, heat transfer through the bearing plate is substantially as efficient as when sheet material 29 contacts platen 35 directly. It is desirable, of course, to employ a material for bearing plate 44 which is reasonably tough and resilient at the temperatures involved. At forming temperatures in the medium range, bearing plate 44 may be a material having good heat conducting properties, but at the high forming temperatures it is more desirable to employ a bearing plate which is a poor heat conductor. The tension applied to bearing plate 44 through springs 45 and 46 allows the bearing plate to deflect as required for the forming operation while at the same time urges the plate to return to its original shape at the completion of the forming operation. This feature is important since such action of bearing plate 44 allows platen 35 to return to its extended position, projecting slightly beyond the upper edge of die blocks 27 and 28 again heating a workpiece by actual metal-to-metal contact prior to and during a subsequent operation. An added advantage of the bearing plate is that it helps to distribute the bearing loads applied to the workpiece.

The operation of the power brake press shown in Figure 4 is identical to that previously described in connection with the press brake configuration of Figures 1 through 3.

The hot platen being retractable between the spaced lower die blocks of the power brake press serves to automatically heat a workpiece only in the areas where the bending stresses are to be applied and maintain the same at the desired temperature throughout the forming operation. The time required to perform the bending operation is no longer critical as in the case of pre-heating forming methods since the temperature will be maintained substantially constant so long as the hot platen is in contact with the work. Moreover, the efficiency of the power brake press operations using the teachings of this invention is substantially the same as those procedures required for cold-work forming.

It is to be understood that certain alterations, modifications and substitutions may be made to the instant disclosure without departing from the spirit and scope of this invention as defined in the appended claims.

I claim:

1. A power brake forming machine comprising, a base member, a pair of spaced die blocks secured to the base member, a movable punch member carried above said base member for reciprocating action relative to the base member, the plane of movement of said punch member being arranged to bisect said spaced die blocks whereby a workpiece interposed between the punch and said die blocks may be formed by pressure applied with said punch, a floating platen interposed between said die blocks, supporting means engaging said platen, spring means normally urging said platen and said supporting means toward said punch, said platen extending above the level of the highest points of said spaced die blocks when in its spring urged extended position whereby a flat sheet workpiece positioned between said die blocks and said punch member will contact said platen in the area opposite said punch, said spring means maintaining platen contact with said workpiece being formed substantially throughout the forming operation, and means carried by said platen for heating the same in the area of contact with said work piece whereby the material being formed is maintained at the desired temperature throughout the forming operation by heat transmitted to the workpiece by said platen.

2. A power brake forming machine as in claim 1 wherein said platen is substantially narrower than the distance between said spaced die blocks and disposed in spaced relation with each of said die blocks, and including a sheet of heat insulating material coextensive with the underside of said platen and contiguous thereto, said supporting means engaging the underside of said sheet, whereby said platen is insulated from said spaced die blocks and from said supporting means.

References Cited in the file of this patent

UNITED STATES PATENTS

| | | |
|---|---|---|
| 305,707 | Norwood | Sept. 23, 1884 |
| 381,175 | Schoen | Apr. 17, 1888 |
| 977,118 | Minshull | Nov. 29, 1910 |
| 1,330,804 | Haskell | Feb. 17, 1920 |
| 1,409,689 | Elmendorf | Mar. 14, 1922 |
| 1,433,879 | Fancher et al. | Oct. 31, 1922 |
| 1,895,401 | Simonsen | Jan. 24, 1933 |
| 2,303,059 | Misfeldt | Nov. 24, 1942 |
| 2,491,717 | Creighton | Dec. 20, 1949 |
| 2,689,400 | Mirando | Sept. 21, 1954 |
| 2,692,421 | Cozzo | Oct. 26, 1954 |

OTHER REFERENCES

The disclosure on pages 24 and 25 of the Journal of Aeronautical Sciences, vol. 8, No. 1, November 1940.

The disclosure on pages 176 through 181 of the magazine "Machinery" for July 1944.